United States Patent
Bernat et al.

(10) Patent No.: US 10,798,157 B2
(45) Date of Patent: Oct. 6, 2020

(54) TECHNOLOGIES FOR TRANSPARENT FUNCTION AS A SERVICE ARBITRATION FOR EDGE SYSTEMS

(71) Applicant: Intel Corporation, Santa Clara, CA (US)

(72) Inventors: Francesc Guim Bernat, Barcelona (ES); Ned Smith, Beaverton, OR (US); Kshitij Doshi, Tempe, AZ (US); Alexander Bachmutsky, Sunnyvale, CA (US); Suraj Prabhakaran, Aachen (DE)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 16/234,734

(22) Filed: Dec. 28, 2018

(65) Prior Publication Data

US 2019/0141119 A1  May 9, 2019

(51) Int. Cl.
  *H04L 29/08* (2006.01)
  *H04L 12/24* (2006.01)

(52) U.S. Cl.
  CPC .......... *H04L 67/1004* (2013.01); *H04L 41/12* (2013.01); *H04L 41/5006* (2013.01); *H04L 41/5019* (2013.01)

(58) Field of Classification Search
  None
  See application file for complete search history.

(56) References Cited

U.S. PATENT DOCUMENTS

| | | | |
|---|---|---|---|
| 2014/0189845 A1* | 7/2014 | Cai | H04L 63/0245 726/12 |
| 2018/0227388 A1* | 8/2018 | Kuo | H04L 67/327 |
| 2018/0375712 A1* | 12/2018 | Krohling | H04L 29/08711 |
| 2019/0188049 A1* | 6/2019 | Choudhary | G06F 9/5072 |
| 2019/0245859 A1* | 8/2019 | Berezin | H04L 63/10 |
| 2019/0349447 A1* | 11/2019 | Adams | H04L 67/32 |
| 2020/0012569 A1* | 1/2020 | Natanzon | G06F 16/1752 |
| 2020/0057676 A1* | 2/2020 | Vaikar | H04L 67/32 |

* cited by examiner

*Primary Examiner* — Joshua Joo
(74) *Attorney, Agent, or Firm* — Barnes & Thornburg LLP (57) ABSTRACT

Technologies for function as a service (FaaS) arbitration include an edge gateway, multiple endpoint devices, and multiple service providers. The edge gateway receives a registration request from a service provider that is indicative of an FaaS function identifier and a transform function. The edge gateway verifies an attestation received from the service provider and registers the service provider. The edge gateway receives a function execution request from an endpoint device that is indicative of the FaaS function identifier. The edge gateway selects the service provider based on the FaaS function identifier, programs an accelerator with the transform function, executes the transform function with the accelerator to transform the function execution request to a provider request, and submits the provider request to the service provider. The service provider may be selected based on an expected service level included in the function execution request. Other embodiments are described and claimed.

25 Claims, 6 Drawing Sheets

TECHNOLOGIES FOR TRANSPARENT FUNCTION AS A SERVICE ARBITRATION FOR EDGE SYSTEMS

BACKGROUND

Certain cloud computing architectures may provide function as a service (FaaS) services. Typical FaaS systems allow a client to invoke a particular function on-demand, without executing a dedicated service process. Typical cloud service providers statically define application requirements, and resource selection for performing requests is typically performed by one or more software orchestration layers and load balancers.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. Furthermore, the disclosed embodiments may be initially encoded as a set of preliminary instructions (e.g., encoded on a machine-readable storage medium) that may require a preliminary processing operations to prepare the instructions for execution on a destination device. The preliminary processing may include combining the instructions with data present on a device, translating the instructions to a different format, performing compression, decompression, encryption, and/or decryption, combining multiple files that include different sections of the instructions, integrating the instructions with other code present on a device, such as a library, an operating system, etc., or similar operations. The preliminary processing may be performed by the source compute device (e.g., the device that is to send the instructions), the destination compute device (e.g., the device that is to execute the instructions), or an intermediary device. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
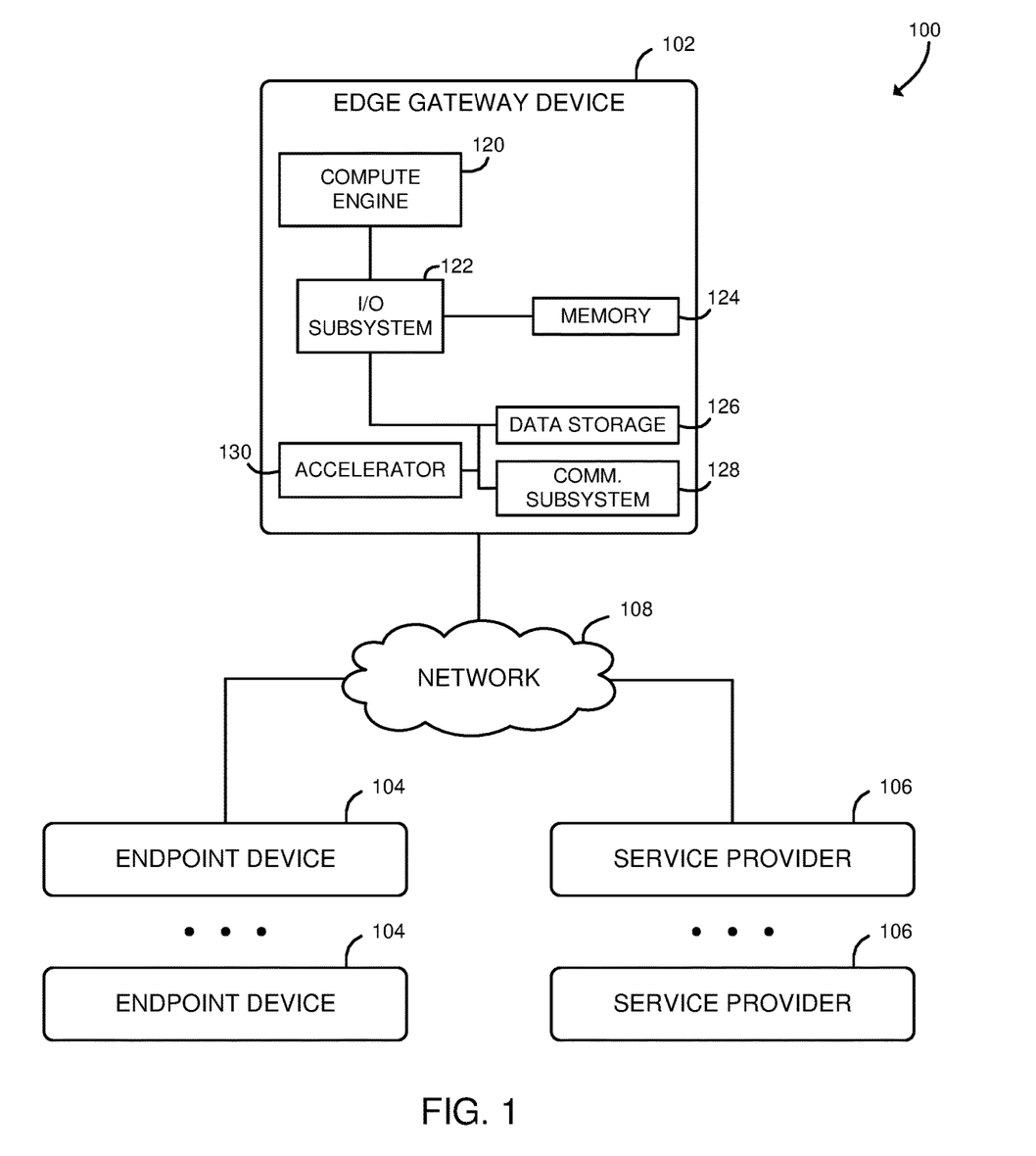
FIG. 1 is a simplified block diagram of at least one embodiment of a system for transparent function as a service (FaaS) arbitration.

Referring now to FIG. 1, a system 100 for transparent function as a service (FaaS) arbitration includes an edge gateway 102, multiple endpoint devices 104, and multiple service providers 106. In use, as described further below, each service provider 106 registers with the edge gateway 102 as providing one or more FaaS functions. Each endpoint device 104 may submit a request for a FaaS function to the edge gateway 102 using standard interfaces. It may be preferred to have a single interface, but to support legacy implementations and integrate multiple different implementations, the edge gateway 102 may support multiple interfaces to endpoint devices 104 and service providers 106, effectively performing some level of translation to match between them. The edge gateway 102 selects a service provider 106 for each FaaS function request, transforms the request to the specific interface of the service provider 106, and submits the request for execution. The service provider 106 may be selected based on expected service level agreement (SLA), reputation, cost, power, geographical location, or other factors. The edge gateway 102 may monitor execution of the FaaS function and update the reputation score of the service provider 106 appropriately. Thus, the system 100 allows edge endpoint devices 104 to discover and access services provided by multiple service providers 106, with attestation and security policies transparently managed by the edge gateway 102. Unlike certain typical cloud architectures, the system 100 may dynamically adjust to changes in service provider offerings and application requirements, without requiring customers to constantly query the cloud provider for updates to FaaS service providers and update requirements for forthcoming requests.

Although FIG. 1 shows a single edge gateway 102 in the system 100, it should understood that the system 100 may include multiple instances of edge gateways 102. Such instances may be responsible for independent subsets of endpoint devices 104 and service providers 106 or may share some or all of those devices 104, 106. For example, the edge gateway 102 instances may be independent or interconnected by a network (e.g., full or partial mesh interconnects or other interconnect topologies) to be able to match between endpoint devices 104 from one edge gateway 102 instance with service providers 106 from another edge gateway instance 102. In some embodiments, the edge gateways 102 may share service provider 106 registrations across the entire system 100.

The edge gateway 102 may be embodied as any type of device capable of performing the functions described herein. For example, the edge gateway 102 may be embodied as, without limitation, a switch, a router, a network device, a computer, a mobile computing device, a server, a workstation, a multiprocessor system, a distributed computing device, and/or a consumer electronic device. Additionally or alternatively, the edge gateway 102 may be embodied as a one or more compute sleds, memory sleds, or other racks, sleds, computing chassis, or other components of a physically disaggregated computing device. As shown in FIG. 1, the illustrative edge gateway 102 includes a compute engine 120, an I/O subsystem 122, a memory 124, a data storage device 126, and a communication subsystem 128. Additionally, in some embodiments, one or more of the illustrative components may be incorporated in, or otherwise form a portion of, another component. For example, the memory 124, or portions thereof, may be incorporated in the compute engine 120 in some embodiments.

The compute engine 120 may be embodied as any type of compute engine capable of performing the functions described herein. For example, the compute engine 120 may be embodied as a single or multi-core processor(s), digital signal processor, microcontroller, field-programmable gate array (FPGA), or other configurable circuitry, application-specific integrated circuit (ASIC), or other processor or processing/controlling circuit. Similarly, the memory 124 may be embodied as any type of volatile or non-volatile memory or data storage capable of performing the functions described herein. In operation, the memory 124 may store various data and software used during operation of the edge gateway 102 such as operating systems, applications, programs, libraries, and drivers. As shown, the memory 124 may be communicatively coupled to the compute engine 120 via the I/O subsystem 122, which may be embodied as circuitry and/or components to facilitate input/output operations with the compute engine 120, the memory 124, and other components of the edge gateway 102. For example, the I/O subsystem 122 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 124 may be directly coupled to the compute engine 120, for example via an integrated memory controller hub. Additionally, in some embodiments, the I/O subsystem 122 may form a portion of a system-on-a-chip (SoC) and be incorporated, along with the compute engine 120, the memory 124, the accelerator 130, and/or other components of the edge gateway 102, on a single integrated circuit chip.

The data storage device 126 may be embodied as any type of device or devices configured for short-term or long-term storage of data such as, for example, memory devices and circuits, memory cards, hard disk drives, solid-state drives, non-volatile flash memory, or other data storage devices. The communications subsystem 128 may be embodied as any communication circuit, device, or collection thereof, capable of enabling communications between the edge gateway 102 and other remote devices over the network 108. The communications subsystem 128 may be configured to use any one or more communication technology (e.g., wired or wireless communications) and associated protocols (e.g., Ethernet, Bluetooth®, Wi-Fi®, WiMAX, 3G, 4G LTE, 5G, etc.) to effect such communication.

The accelerator 130 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator 130 is an FPGA, which may be embodied as an integrated circuit including programmable digital logic resources that may be configured after manufacture. The FPGA may include, for example, a configurable array of logic blocks in communication over a configurable data interchange. The accelerator 130 may be coupled to the compute engine 120 via a high-speed connection interface such as a peripheral bus (e.g., a PCI Express bus) or an inter-processor interconnect (e.g., an in-die interconnect (IDI) or QuickPath Interconect (QPI)), or via any other appropriate interconnect.

Each endpoint device 104 may be embodied as any type of computation or computer device capable of performing the functions described herein, including, without limitation, a computer, a mobile computing device, a wearable computing device, a network appliance, a web appliance, a distributed computing system, an autonomous vehicle, an autonomous aerial vehicle, an Internet of Things (IoT) sensor, an IoT gateway, an industrial automation device, a processor-based system, and/or a consumer electronic device. As such, each endpoint device 104 may include components and features similar to the edge gateway 102, such as a compute engine 120, I/O subsystem 122, memory 124, data storage 126, communication subsystem 128, and/or various peripheral devices. Those individual components of each endpoint device 104 may be similar to the corresponding components of the edge gateway 102, the description of which is applicable to the corresponding components of the endpoint device 104 and is not repeated for clarity of the present description.

Each service provider 106 may be embodied as any type of computation or computer device capable of performing the functions described herein, including, without limitation, a switch, a router, a network device, a computer, a mobile computing device, a server, a workstation, a multiprocessor system, a distributed computing device, and/or a consumer electronic device. Additionally or alternatively, each service provider 106 may be embodied as a one or more compute sleds, memory sleds, or other racks, sleds, computing chassis, or other components of a physically disaggregated computing device. As such, each service provider 106 may include components and features similar to the edge gateway 102, such as a compute engine 120, I/O subsystem 122, memory 124, data storage 126, communication subsystem 128, and/or various peripheral devices. Those individual components of each service provider 106 may be similar to the corresponding components of the edge gateway 102, the description of which is applicable to the corresponding components of the service provider 106 and is not repeated for clarity of the present description.

As discussed in more detail below, the edge gateway 102, the endpoint devices 104, and the service providers 106 may be configured to transmit and receive data with each other and/or other devices of the system 100 over the network 108. The network 108 may be embodied as any number of various wired and/or wireless networks. For example, the network 108 may be embodied as, or otherwise include a mobile access network, a network edge infrastructure, a wired or wireless local area network (LAN), and/or a wired or wireless wide area network (WAN). As such, the network 108 may include any number of additional devices, such as additional base stations, access points, computers, routers, and switches, to facilitate communications among the devices of the system 100. In the illustrative embodiment, the network 108 is embodied as an edge network fabric.

Figure 2:
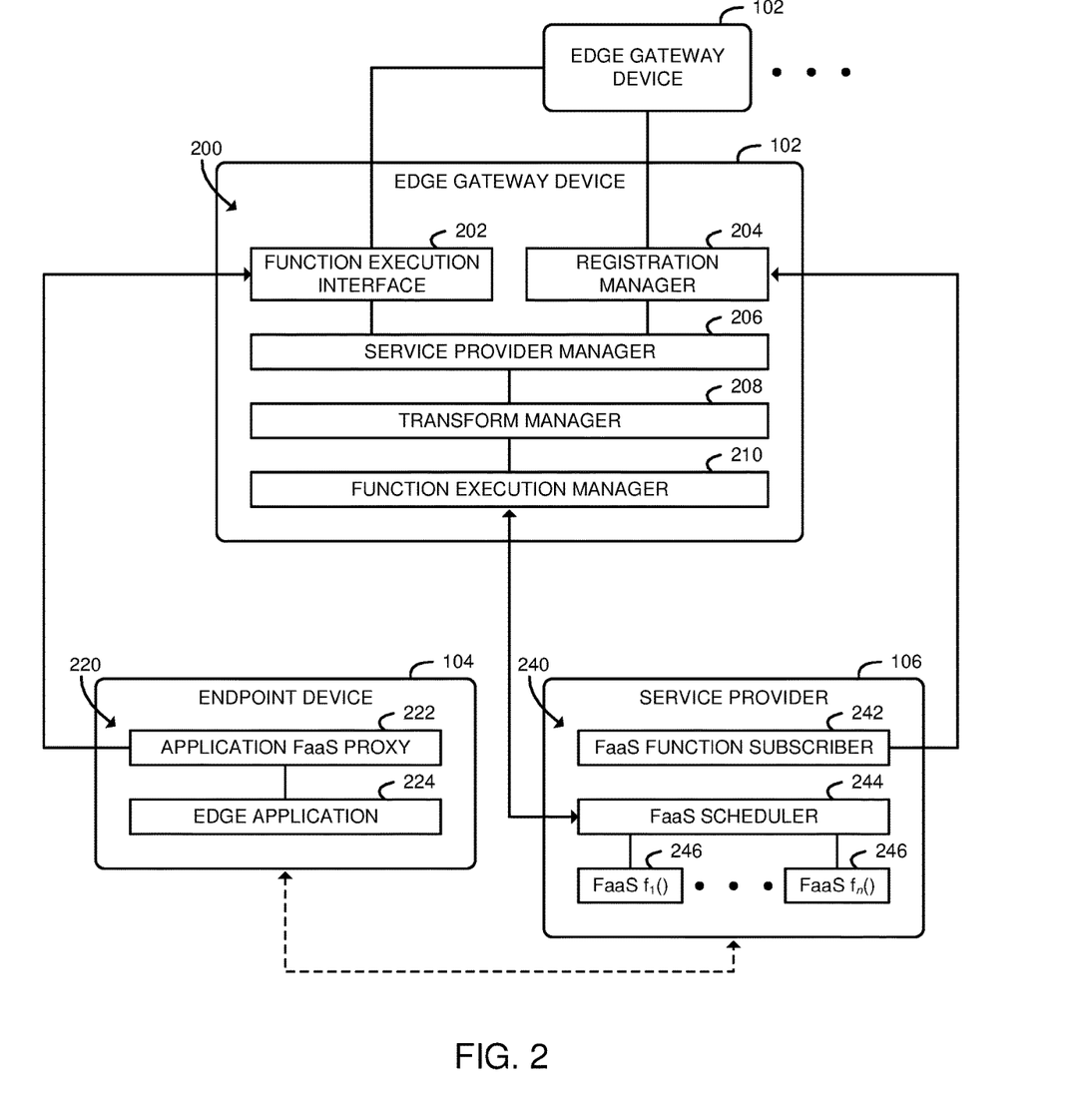
FIG. 2 is a simplified block diagram of at least one embodiment of various environments of the system of FIG. 1.

Referring now to FIG. 2, in an illustrative embodiment, the edge gateway 102 establishes an environment 200 during operation. The illustrative environment 200 includes a function execution interface 202, a registration manager 204, a service provider manager 206, a transform manager 208, and a function execution manager 210. The various components of the environment 200 may be embodied as hardware, firmware, software, or a combination thereof. As such, in some embodiments, one or more of the components of the environment 200 may be embodied as circuitry or collection of electrical devices (e.g., function execution interface circuitry 202, registration manager circuitry 204, service provider manager circuitry 206, transform manager circuitry 208, and/or function execution manager circuitry 210). It should be appreciated that, in such embodiments, one or more of the function execution interface circuitry 202, the registration manager circuitry 204, the service provider manager circuitry 206, the transform manager circuitry 208, and/or the function execution manager circuitry 210 may form a portion of the compute engine 120, the I/O subsystem 122, the accelerator 130, and/or other components of the edge gateway 102. Additionally, in some embodiments, one or more of the illustrative components may form a portion of another component and/or one or more of the illustrative components may be independent of one another.

The function execution interface 202 is configured to expose an FaaS function discovery interface to the endpoint devices 104. The function execution interface 202 is further configured to receive a function execution request from an endpoint device 104. The function execution request is indicative of an FaaS function identifier. The function execution request may also include other parameters such as an expected service level. The function execution interface 202 may be further configured to verify an identity or a security property of the endpoint device 104 in response to receiving the function execution request.

The service provider manager 206 is configured to select a service provider 106 from multiple registered service providers 106 based on the FaaS function identifier. The service provider 106 may be selected based on the expected service level and a service level associated with the service provider 106, based on a reputation score indicative of a proportion of requests completed by the service provider 106, based on prior matched requests (e.g., for stateful services), or based on other parameters.

The transform manager 208 is configured to program the accelerator 130 of the edge gateway 102 with a transform function associated with the service provider 106 and to execute the transform function with the accelerator 130. The transform function transforms the function execution request to a provider request that is compatible with the service provider 106.

The function execution manager 210 is configured to submit the provider request to the service provider 106. The provider request may be submitted to the service provider 106 via another edge gateway 102, as described further below. The function execution manager 210 may be further configured to monitor execution status of the provider request and to update the reputation score or cost data based on the execution status.

The registration manager 204 is configured to receive a registration request from the service provider 106. The registration request is indicative of the FaaS function identifier and the transform function associated with the service provider 106. The registration manager 204 is further configured to receive an attestation from the service provider 106 and verify the registration request and the attestation. The attestation may be indicative of a security property of the service provider 106. The verifying the registration request may include verifying an identity of the service provider 106 or the transform function with a core network. The registration manager 204 is further configured to register the service provider 106 in response to successfully verifying the registration request and the attestation. The registration manager 204 may be further configured to register the service provider 106 with another edge gateway 102 in response verifying the registration request and the attestation. The registration manager 204 may be further configured to determine a reputation score associated with the service provider 106 based on the attestation.

Still referring to FIG. 2, in the illustrative embodiment, the endpoint device 104 establishes an environment 220 during operation. The illustrative environment 220 includes an application function as a service (FaaS) proxy 222 and an edge application 224. The various components of the environment 220 may be embodied as hardware, firmware, software, or a combination thereof. As such, in some embodiments, one or more of the components of the environment 220 may be embodied as circuitry or collection of electrical devices (e.g., application FaaS proxy circuitry 222 and/or edge application circuitry 224). It should be appreciated that, in such embodiments, one or more of the application FaaS proxy circuitry 222 and/or the edge application circuitry 224 may form a portion of the compute engine, the I/O subsystem, and/or other components of the endpoint device 104. Additionally, in some embodiments, one or more of the illustrative components may form a portion of another component and/or one or more of the illustrative components may be independent of one another.

The edge application 224 may be embodied as any internet-of-things application, edge application, or other application executed by the endpoint device 104. The edge application 224 may consume one or more FaaS functions provided by the service providers 106. The application FaaS proxy 222 is configured to submit a function execution request to the edge gateway 102. The function execution request may be submitted in response to a function call or other event triggered by the edge application 224.

Still referring to FIG. 2, in the illustrative embodiment, the service provider 106 establishes an environment 240 during operation. The illustrative environment 240 includes an FaaS function subscriber 242, an FaaS scheduler 244, and one or more FaaS functions 246. The various components of the environment 240 may be embodied as hardware, firmware, software, or a combination thereof. As such, in some embodiments, one or more of the components of the environment 240 may be embodied as circuitry or collection of electrical devices (e.g., FaaS function subscriber circuitry 242, FaaS scheduler circuitry 244, and/or FaaS function circuitry 246). It should be appreciated that, in such embodiments, one or more of the FaaS function subscriber circuitry 242, the FaaS scheduler circuitry 244, and/or the FaaS function circuitry 246 may form a portion of the compute engine, the I/O subsystem, and/or other components of the service provider 106. Additionally, in some embodiments, one or more of the illustrative components may form a portion of another component and/or one or more of the illustrative components may be independent of one another.

The FaaS function subscriber 242 is configured to submit a registration request to the edge gateway 102. The registration request identifies one or more FaaS functions 246 of the service provider 106 and any associated transform functions. The FaaS scheduler 244 is configured to receive a provider request that identifies a FaaS function 246 from the edge gateway 102. Each FaaS function 246 may execute a function, subroutine, lambda, or other computer code in response to being invoked for execution by the FaaS scheduler 244. As shown in FIG. 2, the service provider 106 communicates with the edge gateway 102 and, in some embodiments, may communicate directly with the endpoint device 104 (e.g., to provide execution results of the FaaS function 246).

Figure 3:
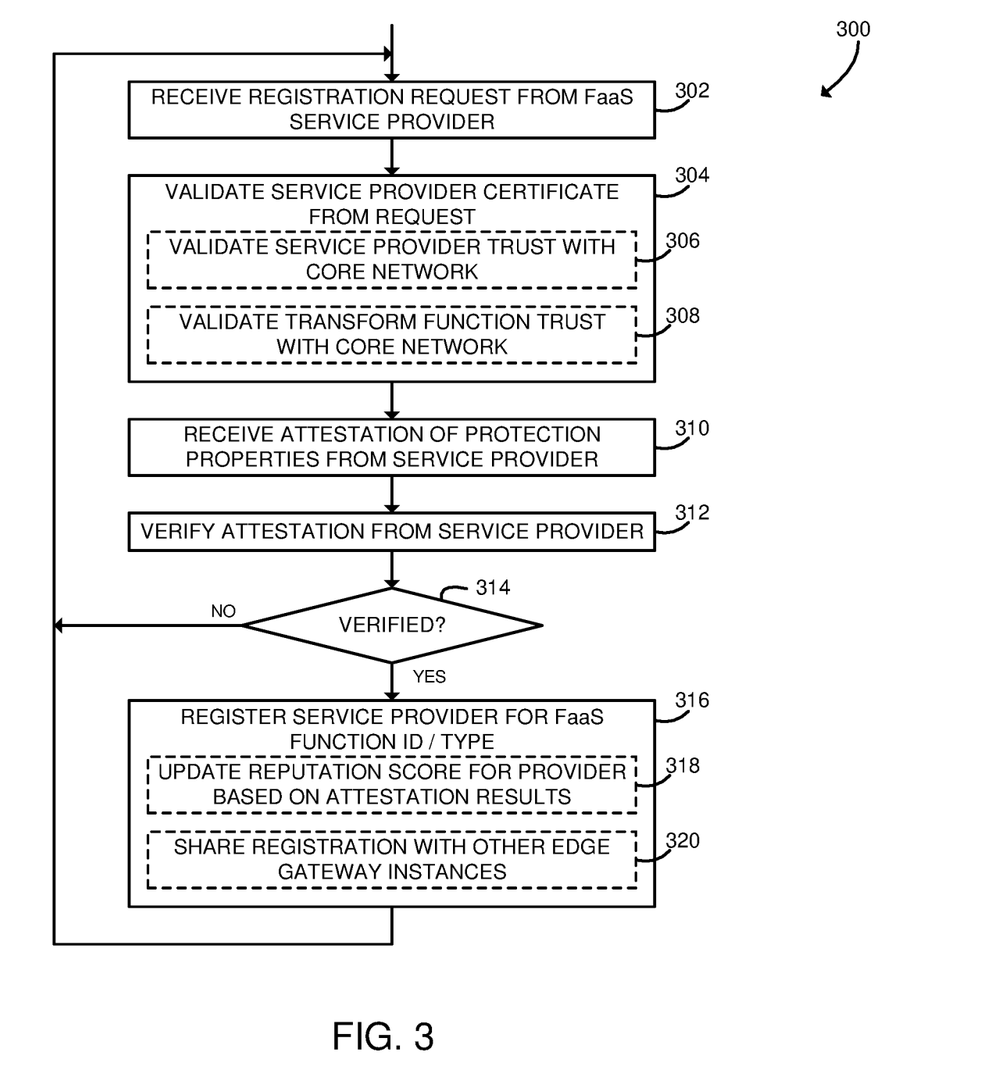
FIG. 3 is a simplified flow diagram of at least one embodiment of a method for service provider registration that may be executed by an edge gateway device of FIGS. 1-2.

Referring now to FIG. 3, in use, the edge gateway 102 may execute a method 300 for service provider registration. It should be appreciated that, in some embodiments, the operations of the method 300 may be performed by one or more components of the environment 200 of the edge gateway 102 as shown in FIG. 2. The method 300 begins in block 302, in which the edge gateway 102 receives a registration request from a FaaS service provider 106. The registration request may include one or more parameters as shown in Function 1, below. EFSP ID (Edge FaaS Service Provider ID) may be embodied as any computing context identity that identifies the service provider 106. The EFSP ID may be embodied as, for example, an Intel® Software Guard Extensions (SGX) enclave identity, a Cloud Native Computing Forum (CNCF) SPIFFE identity, a universally unique identifier (UUID), or a W3C Decentralized Identifier (DID). The FaaS ID parameter identifies the FaaS function(s) 246 provided by the service provider 106. The FaaS Type parameter may identify a general class of FaaS function (e.g., face detection). Thus, in some embodiments, the service provider 106 may provide multiple FaaS functions 246 of the same type with different parameters (e.g., accuracy). The accepted SLAs indicates different service level agreements (SLAs) that will be accepted by the service provider 106. Each SLA may specify one or more performance, accuracy, availability, latency, bandwidth, or other requirements that the service provider 106 agrees to meet during execution of the FaaS function. The Cost may be embodied as any cost associated with processing the FaaS function (e.g., per-invocation cost, bandwidth cost, etc.). The transform function bitstream may be embodied as bitstream data that may be installed and executed on the accelerator 130 of the edge gateway 102. As described further below, the transform function maps between a standardized function interface or API and a specific interface of the service provider 106. The request further includes a service provider certificate associated with the service provider 106.

Request(EFSP ID, FaaS ID, FaaS Type, Accepted SLAs, Cost, Transform Function bitstream, Service Provider Certificate)   (1)

In block 304, the edge gateway 102 validates the service provider certificate included with the registration request. In some embodiments, in block 306 the edge gateway 102 may validate that the service provider 106 is trusted by a core network. The service provider trust may be validated, for example, with a communication provider core network, or with any other network or device that is logically closer to the core network. In some embodiments, in block 308 the edge gateway 102 may validate that the transfer function is trusted by the core network. For example, the edge gateway 102 may validate a certificate, signature, or other identification of the transfer function with the core network.

In block 310, the edge gateway 102 receives an attestation of one or more protection properties from the service provider 106. The attestation may be embodied as any signed data or other proof of the protection properties. The protection properties may include security or other properties of the execution environment of the FaaS function 246. As another example, the protection properties may include key protection properties for keys used to protect end-to-end payloads. In block 312, the edge gateway 102 verifies the attestation received from the service provider 106.

In block 314, the edge gateway 102 determines whether both the registration request and the attestation received from the service provider 106 were verified. If either were not successfully verified, the registration request is rejected and the method 300 loops back to block 302. If the registration request and the attestation are verified, the method 300 advances to block 316.

In block 316, the edge gateway 102 registers the service provider 106 for the requested FaaS function identifier and/or type. As described further below, after registration, the edge gateway 102 may allow endpoint devices 104 to discover and access the service provider 106 and/or the FaaS functions 246 provided by the service provider 106. In some embodiments, in block 318 the edge gateway 102 may update a reputation score associated with the service provider 106 based on attestation results. For example, a higher reputation score may be assigned for service providers 106 that attest to a more secure execution environment and/or key protection properties. As described further below, the edge gateway 102 may select service providers 106 based upon expected reputation score. Additionally or alternatively, in some embodiments the edge gateway 102 may determine a separate reputation score based on the attestation results related to trust/security/protection properties as compared to a reputation score based on reliability/availability/response time as discussed below in connection with FIG. 5.

In some embodiments, in block 320 the edge gateway 102 may share the registration of the service provider 106 with one or more other edge gateway 102 instances. As described above, the other edge gateway 102 instances may be responsible for independent subsets of endpoint devices 104 and service providers 106, or may share some or all of those devices 104, 106. Sharing relevant registration information among multiple edge gateways 102 may enable further matching between FaaS function requests and service providers as described below. After registering the service provider 106, the method 300 loops back to block 302 to continue registering additional service providers 106.

Figure 4:
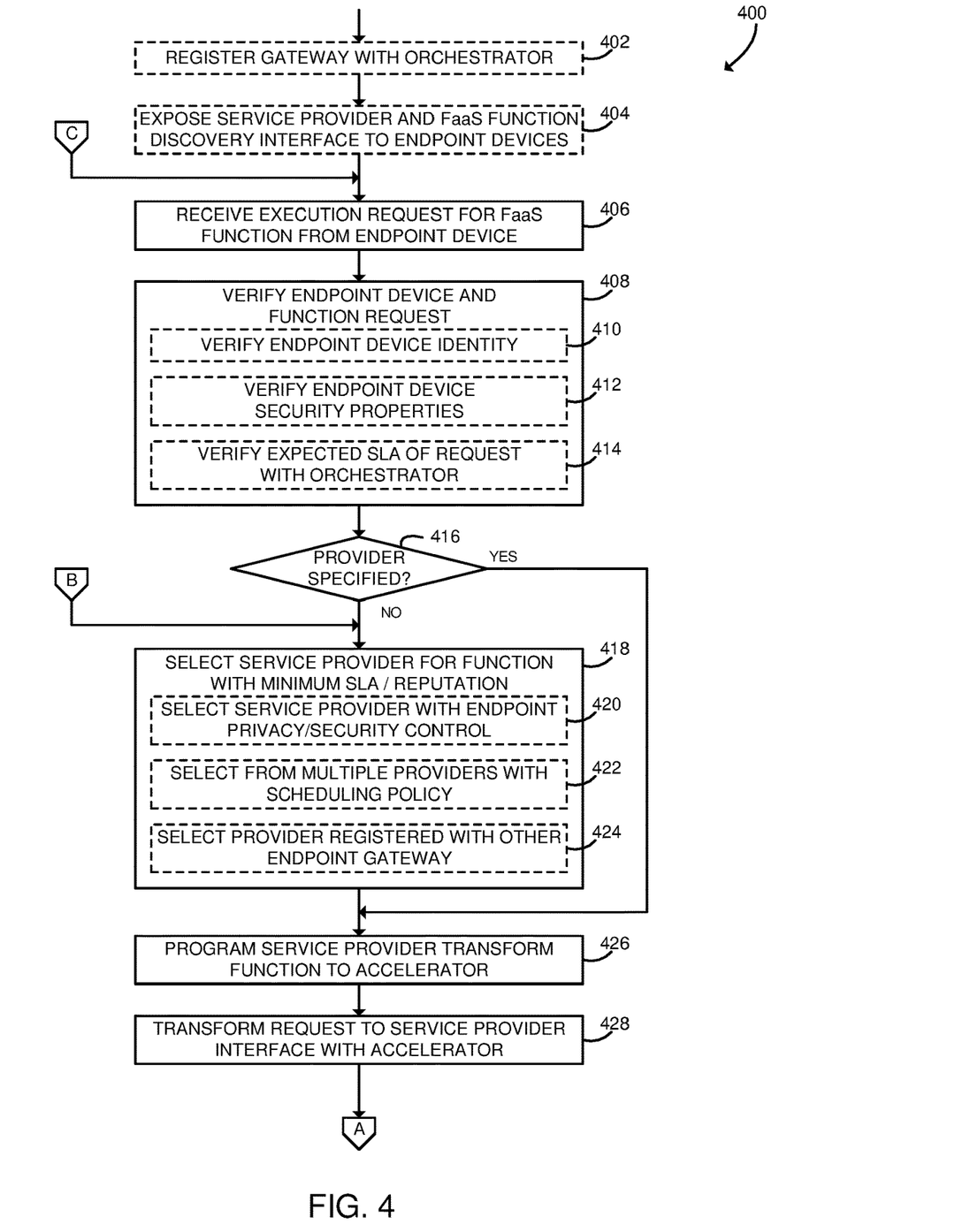
FIGS. 4 and 5 are a simplified flow diagram of at least one embodiment of a method for service provider and function arbitration that may be executed by an edge gateway device of FIGS. 1-2.
Figure 5:
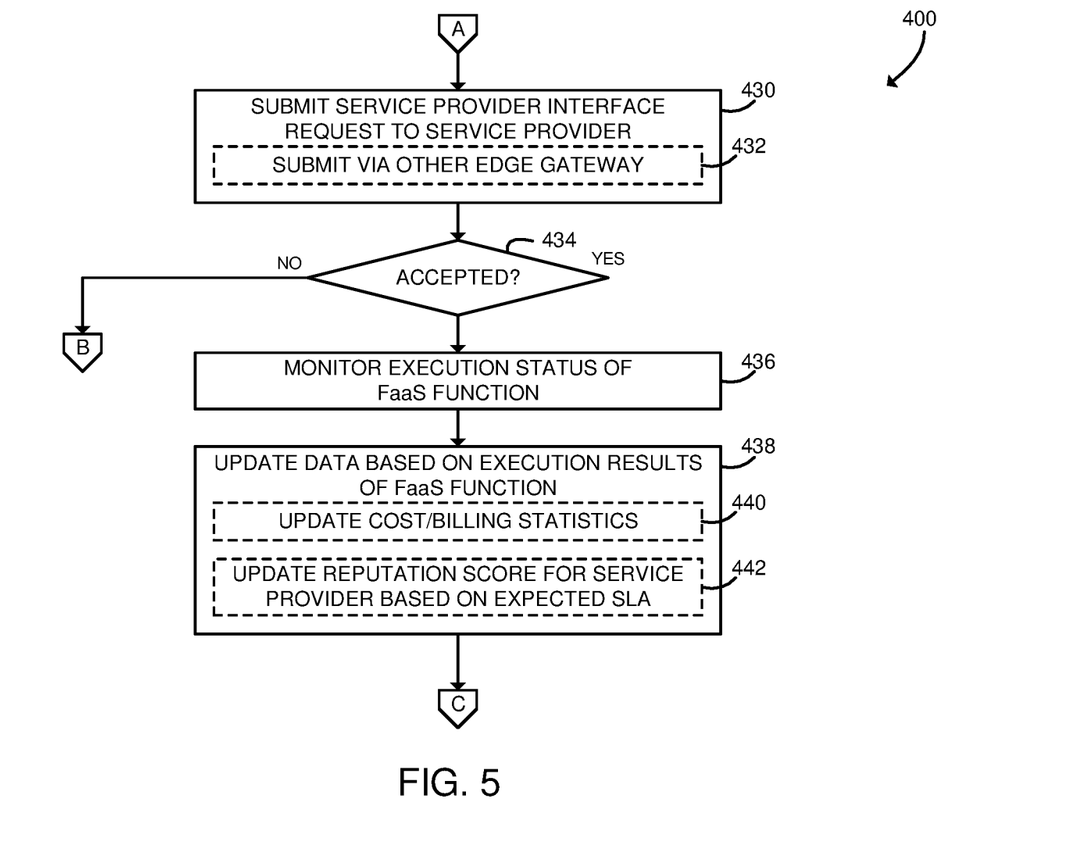

Referring now to FIGS. 4 and 5, in use, the edge gateway 102 may execute a method 400 for service provider and function arbitration. It should be appreciated that, in some embodiments, the operations of the method 400 may be performed by one or more components of the environment 200 of the edge gateway 102 as shown in FIG. 2. The method 400 begins in block 402, in which in some embodiments the edge gateway 102 may register with an orchestrator or other orchestration service. The edge gateway 102 may, for example, register functions for discovery and execution with the orchestrator as a service provider. In that example, the orchestrator may expose discovery interfaces to the endpoint devices 104 as entry points to FaaS function execution. In some embodiments, in block 404 the edge gateway 102 may expose service provider 106 and FaaS function discovery interfaces to the endpoint devices 104. For example, the edge gateway 102 may expose RESTful and/or non-RESTful interfaces for service provider discovery, function discovery, and/or function execution. As described above, for service provider discovery the edge gateway 102 may accept subscriptions from various service providers 106 that host specific FaaS functions or workloads. The function discovery interface may provide a list of functions provided by a service provider 106 according to a particular FasS type (e.g., video analytics, face recognition, etc.), as well as other properties such as SLA, cost, reputation score, bit-stream acceleration availability, and function-specific properties. As described further below, the function execution interface may provide a generic API to invoke for scheduling FaaS function for execution.

In block 406, the edge gateway 102 receives an execution request for a FaaS function from an endpoint device 104. The execution request may include one or more parameters as shown in Function 2, below. As described above, The FaaS ID parameter identifies the FaaS function(s) 246 requested by the endpoint device 104. In some embodiments, the FaaS ID may identify a FaaS type or class of function requested by the endpoint device 104 (e.g., face recognition, video analytics, or other function). The Expected SLA parameter indicates the service level agreement (SLA) requested by the endpoint device 104. As described above, each SLA may specify one or more performance, accuracy, availability, latency, bandwidth, or other requirements that the endpoint device 104 requests be met during execution of the FaaS function. Expected cost may be embodied as a maximum cost other requested cost associated with processing the FaaS function (e.g., per-invocation cost, bandwidth cost, etc.). The Expected Reputation Score may be embodied as a minimum score or other requested reputation score for the service provider 106 that executes the FaaS function. Reputation score may be embodied as any value indicative of how likely the service provider 106 is to satisfy the expected SLA. For example, the reputation score may be embodied as a percentage of FaaS function executions by a particular service provider 106 that have satisfied the associated SLA. The Expected Reputation Score may be represented as, for example, a score as in M of N stars, a real value between 0 and 1, or other score, and may include a range from low to high values. Expected EFSP may be embodied as an identifier of a particular service provider 106 requested by the endpoint device 104. The Expected EFSP may be determined by the endpoint device 104, for example, using a service provider discovery interface of the edge gateway 102. The function execution request may also include one or more function-specific invocation parameters.

$$\text{Execute(FaaS ID, Expected SLA, Expected Cost,} \\ \text{Expected Reputation Score, Expected EFSP)} \quad (2)$$

After receiving the execution request, in block 408 the edge gateway 102 verifies the endpoint device 104 and the function execution request. The edge gateway 102 may, for example, verify FaaS function invocation parameters for semantic and syntactic correctness. If the endpoint device 104 and/or the function execution request are not verified, the edge gateway 102 may reject the function execution request. In some embodiments, in block 410 the edge gateway 102 may verify an identity of the endpoint device 104. For example, the edge gateway 102 may verify a credential of the endpoint device 104, such as an identity certificate, OAuth2 token, password, or other credentials. In some embodiments, in block 412 the edge gateway 102 may verify one or more security properties of the endpoint device 104. For example, the edge gateway 102 may receive an attestation from the endpoint device 104 and verify the security properties indicated in the attestation. The endpoint device 104 may perform any secure attestation protocol, such as a Trusted Computing Group (TCG) TPM Quote operation or an exchange as described in the W3C Verifiable Claims data model. In some embodiments, in block 414 the endpoint device 104 may verify that the expected SLA of the request is authorized by a trusted orchestrator. After successfully verifying the endpoint device 104 and the function execution request, the method 400 advances to block 416.

In block 416, the edge gateway 102 determines whether a service provider 106 was specified in the function execution request. If so, the method 400 skips ahead to block 426, described below. If no service provider 106 is specified in the request, the method 400 advances to block 418.

In block 418, the edge gateway 102 selects a service provider 106 for the requested FaaS function based on the accepted SLA, reputation score, and/or other parameters associated with the service provider 106. For example, the edge gateway 102 may select a service provider 106 having an accepted SLA that meets or exceeds the expected SLA included in the function execution request. Similarly, the edge gateway 102 may select a service provider 106 having a reputation score that meets or exceeds the expected reputation score included in the function execution request. The edge gateway 102 selects the service provider 106 from one or more service providers 106 that were previously registered as providing the requested FaaS function as described above in connection with FIG. 3. In some embodiments, in block 420 the edge gateway 102 may select the service provider 106 while applying an endpoint device privacy and/or security control. For example, certain endpoint devices 104 may be restricted from accessing particular service providers 106 based on one or more security policies, privacy policies, or other policies. In some embodiments, in block 422 the edge gateway 102 may select from multiple service providers 106 using a scheduling policy. For example, multiple service providers 106 may be registered to provide the requested FaaS function with the expected SLA. In that circumstance, the edge gateway 102 may select among the qualifying service providers 106 using a round-robin scheduling policy or other scheduling policy. In some embodiments, in block 424, the edge gateway 102 may select a service provider 106 that was originally registered with a different edge gateway 102. In those embodiments, the registration information may be shared among multiple edge gateway 102 instances as described above.

In block 426, the edge gateway 102 programs a transform function associated with the selected service provider 106 to the accelerator 130. The transform function may be embodied as bitstream, firmware, or other data that may be programmed to the accelerator 130 for execution. Illustratively, the accelerator 130 is an FPGA, and the FGPA may be configured or partially configured with bitstream data corresponding to the transform function.

In block 428, the edge gateway 102 transforms the function execution request to a service provider request that conforms to the interface provided by the selected service provider 106 using the transform function programmed to the accelerator 130. For example, the function execution request may be a request to a generic face recognition API. In that example, the accelerator 130 may transform the request, associated parameters, and/or other data into a request matching a particular face recognition API established by the service provider 106. Transforming the request using the accelerator 130 may reduce latency or otherwise improve performance for servicing the function execution request.

Referring now to FIG. 5, in block 430, the edge gateway 102 submits the service provider interface request to the selected service provider 106 for execution. The edge gateway 102 may submit the request to an FaaS scheduler or other FaaS component of the service provider 106. In some embodiments, in block 432 the edge gateway 102 may submit the service request via another edge gateway 102 instance, for example the instance to which the service provider 106 originally registered. In block 434, the edge gateway 102 determines whether the selected service provider 106 accepted the service provider interface request. For example, the service provider 106 may accept the request only if sufficient resources are available to satisfy the expected SLA of the request. If the service provider request is not accepted, the method 400 loops back to block 418, shown in FIG. 4, in which the edge gateway 102 may select a different service provider 106 for execution. If the service provider request is accepted, the method 400 advances to block 436.

In block 436 the edge gateway 102 monitors the execution status of the FaaS function. The edge gateway 102 may, for example, determine whether the service provider 106 has successfully completed processing the FaaS function request, and whether the service provider 106 satisfied the expected SLA. In a system 100 with multiple edge gateway 102 instances, such monitoring may be performed by the edge gateway 102 instance that handled the service provider 106 registration, the edge gateway 102 instance that is handling the FaaS function request, or both instances. The edge gateway 102 may monitor the execution status using a telemetry collection infrastructure based on system audit, performance counters, power metering in a main board, power supplies, daughter cards, memory, CPU, FPGAs, GPUs, system software and trusted execution environments, BMCs, or other telemetry system. In some embodiments, the edge gateway 102 may receive execution results from the service provider 106 and forward the results to the endpoint device 104. In some embodiments, the endpoint device 104 and the service provider 106 may communicate directly. The edge gateway 102 may poll or otherwise wait for completion of the FaaS function.

In block 438, the edge gateway 102 updates data based on the execution results of the FaaS function. In some embodiments, in block 440 the edge gateway 102 may update cost and/or billing statistics based on execution of the FaaS function. In some embodiments, in block 442, the edge gateway 102 may update a reputation score associated with the service provider 106 based on whether the expected SLA was satisfied. For example, the reputation score may be embodied as a percentage of requests that are satisfied within the expected SLA by the particular service provider 106. After updating data based on execution results, the method 400 loops back to block 406, shown in FIG. 4, to process additional function execution requests.

Figure 6:
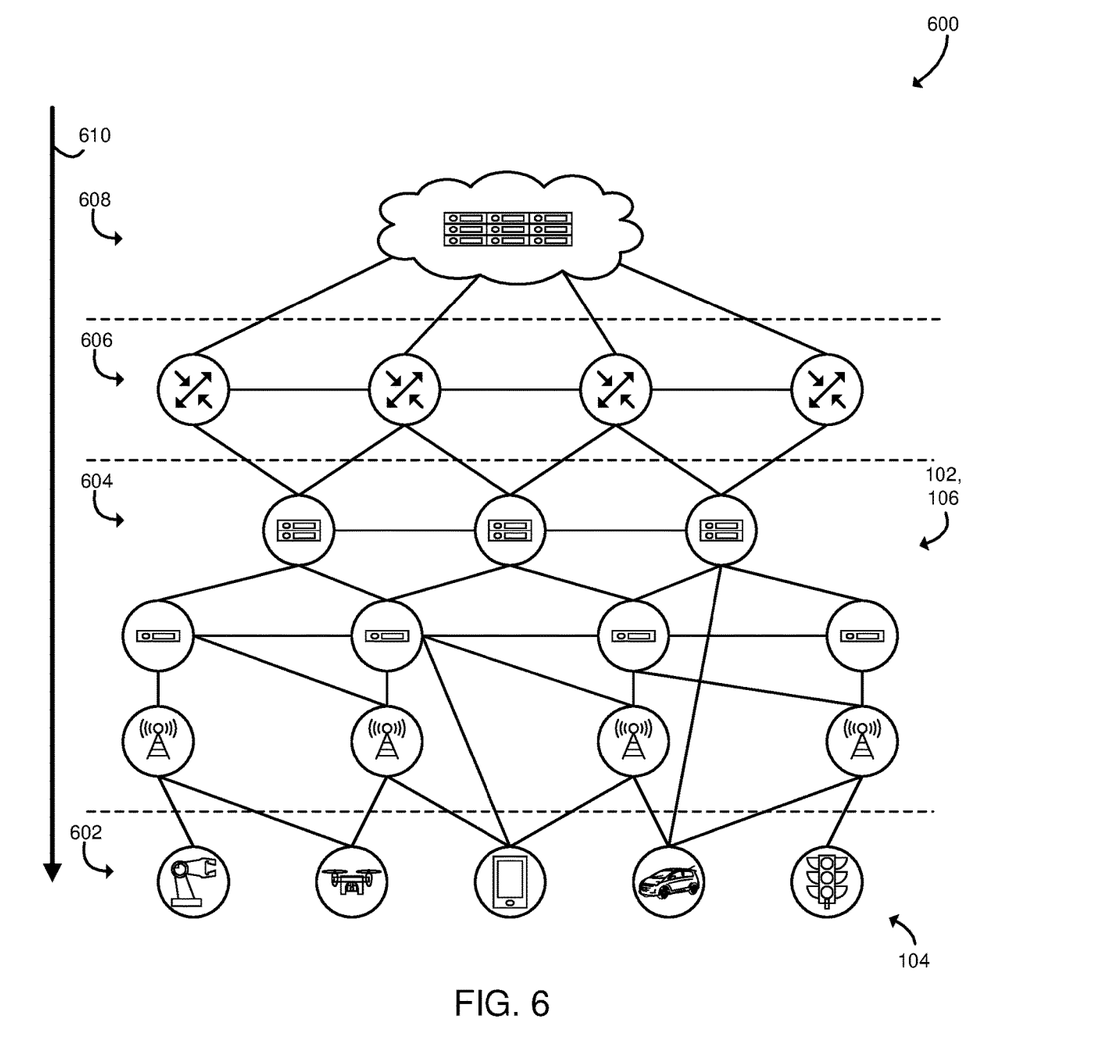
FIG. 6 is a simplified block diagram of at least one embodiment of an edge architecture that may include the system of FIGS. 1-2.

Referring now to FIG. 6, diagram 600 shows an edge architecture that may include the system 100. As shown, the edge architecture includes multiple layers 602, 604, 606, 608. Each layer includes multiple nodes that may communicate with an edge fabric to other nodes of the same layer and/or nodes at other layers. As shown, the endpoint devices 104 may be included in the things/endpoint layer 602. The things/endpoint layer 602 may include large numbers of endpoint devices 104 that are heterogeneous, may be mobile, and are widely distributed geographically. The access/edge layer 604 may include access network components such as wireless towers, access points, base stations, intermediate nodes, gateways, fog nodes, central offices, and other access network or edge components. Components of the access/edge layer 604 may be distributed at the building, small cell, neighborhood, or cell scale. Thus, components of the access/edge layer 604 may be relatively close in physical proximity to components of the things/endpoint layer 602. As shown, the access/edge layer 604 may include the edge gateway 102 and the service providers 106. The core network layer 606 may include core network routers, network gateways, servers, and other more-centralized computing devices. Components of the core network layer 606 may be distributed regionally or nationally. The cloud/Internet layer 608 may include Internet backbone routers, cloud service providers, datacenters, and other cloud resources. The components of the cloud/Internet layer 608 may be distributed globally.

As shown, the edge architecture is organized according to a logical gradient 610 from global, cloud-based components toward local, endpoint devices. Components that are closer to the network edge (i.e., closer to the endpoint layer 602) may be smaller but more numerous, with fewer processing resources and lower power consumption, as compared to components that are closer to the network core (i.e., closer to the cloud/Internet layer 608). However, network communications among components closer to the network edge may be faster and/or have lower latency as compared to communications that traverse through layers closer to the network core. The same logical gradient 610 may apply to components within a layer. For example, the access/edge layer 604 may include numerous, widely spread base stations, street cabinets, and other access nodes as well as less-numerous but more sophisticated central offices or other aggregation nodes. Thus, by including FaaS function arbitration and execution in the access/edge layer 608 or other components close to the network edge, the system 100 may improve latency and performance as compared to traditional cloud-computing based FaaS architectures.

It should be appreciated that, in some embodiments, the methods 300 and/or 400 may be embodied as various instructions stored on a computer-readable media, which may be executed by the compute engine 120, the I/O subsystem 122, the accelerator 130, and/or other components of the edge gateway 102 to cause the edge gateway 102 to perform the respective method 300 and/or 400. The computer-readable media may be embodied as any type of media capable of being read by the edge gateway 102 including, but not limited to, the memory 124, the data storage device 126, firmware devices, other memory or data storage devices of the edge gateway 102, portable media readable by a peripheral device of the edge gateway 102, and/or other media.

EXAMPLES

Illustrative examples of the technologies disclosed herein are provided below. An embodiment of the technologies may include any one or more, and any combination of, the examples described below.

Example 1 includes an edge gateway device for function as a service arbitration, the edge gateway device comprising: a function execution interface to receive a function execution request from an endpoint device, wherein the function execution request is indicative of a function as a service (FaaS) function identifier; a service provider manager to select a service provider device from a plurality of registered service provider devices based on the FaaS function identifier; a transform manager to (i) program an accelerator of the edge gateway device with a transform function associated with the service provider device and (ii) execute the transform function with the accelerator to transform the function execution request to a provider request, wherein the provider request is compatible with the service provider device; and a function execution manager to submit the provider request to the service provider device.

Example 2 includes the subject matter of Example 1, and wherein: to receive the function execution request comprises to receive an expected service level from the endpoint device; and to select the service provider device comprises to select the service provider device based on the expected service level and a service level associated with the service provider device.

Example 3 includes the subject matter of any of Examples 1 and 2, and wherein to select the service provider device comprises to select the service provider device based on a reputation score associated with the service provider device, wherein the reputation score is indicative of a proportion of requests completed by the service provider device within the service level associated with the service provider device.

Example 4 includes the subject matter of any of Examples 1-3, and wherein the function execution manager is further to: monitor an execution status of the provider request in response to submission of the provider request to the service provider device; and update the reputation score based on the execution status.

Example 5 includes the subject matter of any of Examples 1-4, and wherein to submit the provider request comprises to submit the provider request to the service provider device via a second edge gateway device.

Example 6 includes the subject matter of any of Examples 1-5, and wherein the function execution manager is further to: monitor an execution status of the provider request in response to submission of the provider request to the service provider device; and update cost data associated with the provider request based on the execution status.

Example 7 includes the subject matter of any of Examples 1-6, and wherein the function execution interface is further to verify an identity of the endpoint device in response to receipt of the function execution request.

Example 8 includes the subject matter of any of Examples 1-7, and wherein the function execution interface is further to verify a security property of the endpoint device in response to receipt of the function execution request.

Example 9 includes the subject matter of any of Examples 1-8, and further comprising a registration manager to: receive a registration request from the service provider device, wherein the registration request is indicative of the FaaS function identifier and the transform function; receive an attestation from the service provider device; verify the registration request and the attestation; and register the service provider device in the plurality of service provider devices in response to verification of the registration request and the attestation; wherein to select the service provider device comprises to select the service provider device in response to registration of the service provider device.

Example 10 includes the subject matter of any of Examples 1-9, and wherein the attestation is indicative of a security property of the service provider device.

Example 11 includes the subject matter of any of Examples 1-10, and wherein the registration manager is further to determine a reputation score associated with the service provider device based on the attestation.

Example 12 includes the subject matter of any of Examples 1-11, and wherein to verify the registration request comprises to verify an identity of the service provider device with a core network.

Example 13 includes the subject matter of any of Examples 1-12, and wherein to verify the registration request comprises to verify the transform function with a core network.

Example 14 includes the subject matter of any of Examples 1-13, and wherein the registration manager is further to register the service provider device with a second edge gateway device in response to verification of the registration request and the attestation.

Example 15 includes the subject matter of any of Examples 1-14, and wherein: the function execution interface is further to expose an FaaS function discovery interface to a plurality of endpoint devices; and to receive the function execution request comprises to receive the function execution request in response to exposing of the FaaS function discovery interface.

Example 16 includes a method for function as a service arbitration, the method comprising: receiving, by an edge gateway device, a function execution request from an endpoint device, wherein the function execution request is indicative of a function as a service (FaaS) function identifier; selecting, by the edge gateway device, a service provider device from a plurality of registered service provider devices based on the FaaS function identifier; programming, by the edge gateway device, an accelerator of the edge gateway device with a transform function associated with the service provider device; executing, by the accelerator, the transform function to transform the function execution request to a provider request, wherein the provider request is compatible with the service provider device; and submitting, by the edge gateway device, the provider request to the service provider device.

Example 17 includes the subject matter of Example 16, and wherein: receiving the function execution request comprises receiving an expected service level from the endpoint device; and selecting the service provider device comprises selecting the service provider device based on the expected service level and a service level associated with the service provider device.

Example 18 includes the subject matter of any of Examples 16 and 17, and wherein selecting the service provider device comprises selecting the service provider device based on a reputation score associated with the service provider device, wherein the reputation score is indicative of a proportion of requests completed by the service provider device within the service level associated with the service provider device.

Example 19 includes the subject matter of any of Examples 16-18, and further comprising: monitoring, by the edge gateway device, an execution status of the provider request in response to submitting the provider request to the service provider device; and updating, by the edge gateway device, the reputation score based on the execution status.

Example 20 includes the subject matter of any of Examples 16-19, and wherein submitting the provider request comprises submitting the provider request to the service provider device via a second edge gateway device.

Example 21 includes the subject matter of any of Examples 16-20, and further comprising: monitoring, by the edge gateway device, an execution status of the provider request in response to submitting the provider request to the service provider device; and updating, by the edge gateway device, cost data associated with the provider request based on the execution status.

Example 22 includes the subject matter of any of Examples 16-21, and further comprising verifying, by the edge gateway device, an identity of the endpoint device in response to receiving the function execution request.

Example 23 includes the subject matter of any of Examples 16-22, and further comprising verifying, by the edge gateway device, a security property of the endpoint device in response to receiving the function execution request.

Example 24 includes the subject matter of any of Examples 16-23, and further comprising: receiving, by the edge gateway device, a registration request from the service provider device, wherein the registration request is indicative of the FaaS function identifier and the transform function; receiving, by the edge gateway device, an attestation from the service provider device; verifying, by the edge gateway device, the registration request and the attestation; and registering, by the edge gateway device, the service provider device in the plurality of service provider devices in response to verifying the registration request and the attestation; wherein selecting the service provider device comprises selecting the service provider device in response to registering the service provider device.

Example 25 includes the subject matter of any of Examples 16-24, and wherein receiving the attestation comprises receiving an attestation indicative of a security property of the service provider device.

Example 26 includes the subject matter of any of Examples 16-25, and further comprising determining, by the edge gateway device, a reputation score associated with the service provider device based on the attestation.

Example 27 includes the subject matter of any of Examples 16-26, and wherein verifying the registration request comprises verifying an identity of the service provider device with a core network.

Example 28 includes the subject matter of any of Examples 16-27, and wherein verifying the registration request comprises verifying the transform function with a core network.

Example 29 includes the subject matter of any of Examples 16-28, and further comprising registering, by the edge gateway device, the service provider device with a second edge gateway device in response to verifying the registration request and the attestation.

Example 30 includes the subject matter of any of Examples 16-29, and further comprising: exposing, by the edge gateway device, a FaaS function discovery interface to a plurality of endpoint devices; wherein receiving the function execution request comprises receiving the function execution request in response to exposing the FaaS function discovery interface.

Example 31 includes a computing device comprising: a processor; and a memory having stored therein a plurality of instructions that when executed by the processor cause the computing device to perform the method of any of Examples 16-30.

Example 32 includes one or more non-transitory, computer-readable storage media comprising a plurality of instructions stored thereon that in response to being prepared for execution and subsequently being executed result in a computing performing the method of any of Examples 16-30.

Example 33 includes a computing device comprising means for performing the method of any of Examples 16-30.

The invention claimed is:

1. An edge gateway device for function as a service arbitration, the edge gateway device comprising:
   a hardware processor; and
   one or more memory devices having stored therein a plurality of computer-readable instructions that, when executed by the hardware processor, cause the edge gateway device to establish:
   a function execution interface to receive a function execution request from an endpoint device, wherein the function execution request is indicative of a function as a service (FaaS) function identifier;
   a service provider manager to select a service provider device from a plurality of registered service provider devices based on the FaaS function identifier;
   a transform manager to (i) program an accelerator of the edge gateway device with a transform function associated with the service provider device and (ii) execute the transform function with the accelerator to transform the function execution request to a provider request, wherein the provider request is compatible with the service provider device; and
   a function execution manager to submit the provider request to the service provider device.

2. The edge gateway device of claim 1, wherein:
   to receive the function execution request comprises to receive an expected service level from the endpoint device; and
   to select the service provider device comprises to select the service provider device based on the expected service level and a service level associated with the service provider device.

3. The edge gateway device of claim 2, wherein to select the service provider device comprises to select the service provider device based on a reputation score associated with the service provider device, wherein the reputation score is indicative of a proportion of requests completed by the service provider device within the service level associated with the service provider device.

4. The edge gateway device of claim 3, wherein the function execution manager is further to:
   monitor an execution status of the provider request in response to submission of the provider request to the service provider device; and
   update the reputation score based on the execution status.

5. The edge gateway device of claim 1, wherein to submit the provider request comprises to submit the provider request to the service provider device via a second edge gateway device.

6. The edge gateway device of claim 1, wherein the function execution interface is further to verify a security property of the endpoint device in response to receipt of the function execution request.

7. The edge gateway device of claim 1, wherein the one or more memory devices having stored therein a plurality of computer-readable instructions that, when executed by the hardware processor, further cause the edge gateway device to establish a registration manager to:
receive a registration request from the service provider device, wherein the registration request is indicative of the FaaS function identifier and the transform function;
receive an attestation from the service provider device;
verify the registration request and the attestation; and
register the service provider device in the plurality of service provider devices in response to verification of the registration request and the attestation;
wherein to select the service provider device comprises to select the service provider device in response to registration of the service provider device.

8. The edge gateway device of claim 7, wherein the attestation is indicative of a security property of the service provider device.

9. The edge gateway device of claim 8, wherein the registration manager is further to determine a reputation score associated with the service provider device based on the attestation.

10. The edge gateway device of claim 7, wherein to verify the registration request comprises to verify an identity of the service provider device with a core network.

11. The edge gateway device of claim 7, wherein to verify the registration request comprises to verify the transform function with a core network.

12. The edge gateway device of claim 7, wherein the registration manager is further to register the service provider device with a second edge gateway device in response to verification of the registration request and the attestation.

13. The edge gateway device of claim 1, wherein:
the function execution interface is further to expose an FaaS function discovery interface to a plurality of endpoint devices; and
to receive the function execution request comprises to receive the function execution request in response to exposing of the FaaS function discovery interface.

14. A method for function as a service arbitration, the method comprising:
receiving, by an edge gateway device, a function execution request from an endpoint device, wherein the function execution request is indicative of a function as a service (FaaS) function identifier;
selecting, by the edge gateway device, a service provider device from a plurality of registered service provider devices based on the FaaS function identifier;
programming, by the edge gateway device, an accelerator of the edge gateway device with a transform function associated with the service provider device;
executing, by the accelerator, the transform function to transform the function execution request to a provider request, wherein the provider request is compatible with the service provider device; and
submitting, by the edge gateway device, the provider request to the service provider device.

15. The method of claim 14, wherein:
receiving the function execution request comprises receiving an expected service level from the endpoint device; and
selecting the service provider device comprises selecting the service provider device based on the expected service level and a service level associated with the service provider device.

16. The method of claim 15, wherein selecting the service provider device comprises selecting the service provider device based on a reputation score associated with the service provider device, wherein the reputation score is indicative of a proportion of requests completed by the service provider device within the service level associated with the service provider device.

17. The method of claim 16, further comprising:
monitoring, by the edge gateway device, an execution status of the provider request in response to submitting the provider request to the service provider device; and
updating, by the edge gateway device, the reputation score based on the execution status.

18. The method of claim 14, further comprising:
receiving, by the edge gateway device, a registration request from the service provider device, wherein the registration request is indicative of the FaaS function identifier and the transform function;
receiving, by the edge gateway device, an attestation from the service provider device;
verifying, by the edge gateway device, the registration request and the attestation; and
registering, by the edge gateway device, the service provider device in the plurality of service provider devices in response to verifying the registration request and the attestation;
wherein selecting the service provider device comprises selecting the service provider device in response to registering the service provider device.

19. The method of claim 18, wherein receiving the attestation comprises receiving an attestation indicative of a security property of the service provider device.

20. One or more non-transitory, computer-readable storage media comprising a plurality of instructions stored thereon that, after being prepared for execution, cause an edge gateway device that executes the prepared instructions to:
receive a function execution request from an endpoint device, wherein the function execution request is indicative of a function as a service (FaaS) function identifier;
select a service provider device from a plurality of registered service provider devices based on the FaaS function identifier;
program an accelerator of the edge gateway device with a transform function associated with the service provider device;
execute, by the accelerator, the transform function to transform the function execution request to a provider request, wherein the provider request is compatible with the service provider device; and
submit the provider request to the service provider device.

21. The one or more non-transitory, computer-readable storage media of claim 20, wherein:
to receive the function execution request comprises to receive an expected service level from the endpoint device; and
to select the service provider device comprises to select the service provider device based on the expected service level and a service level associated with the service provider device.

22. The one or more non-transitory, computer-readable storage media of claim 21, wherein to select the service provider device comprises to select the service provider device based on a reputation score associated with the service provider device, wherein the reputation score is indicative of a proportion of requests completed by the service provider device within the service level associated with the service provider device.

23. The one or more non-transitory, computer-readable storage media of claim 22, further comprising a plurality of instructions stored thereon that, after being prepared for execution, cause the edge gateway device that executes the prepared instructions to:

monitor an execution status of the provider request in response to submitting the provider request to the service provider device; and update the reputation score based on the execution status.

24. The one or more non-transitory, computer-readable storage media of claim 20, further comprising a plurality of instructions stored thereon that, after being prepared for execution, cause the edge gateway device that executes the prepared instructions to:

receive a registration request from the service provider device, wherein the registration request is indicative of the FaaS function identifier and the transform function;

receive an attestation from the service provider device;

verify the registration request and the attestation; and register the service provider device in the plurality of service provider devices in response to verifying the registration request and the attestation;

wherein to select the service provider device comprises to select the service provider device in response to registering the service provider device.

25. The one or more non-transitory, computer-readable storage media of claim 24, wherein to receive the attestation comprises to receive an attestation indicative of a security property of the service provider device.

* * * * *